(12) United States Patent
Schmit et al.

(10) Patent No.: US 8,792,645 B2
(45) Date of Patent: Jul. 29, 2014

(54) AUTHENTICATION AND DATA SECURITY FOR WIRELESS NETWORKS

(71) Applicant: Honeywell International Inc., Morristown, NJ (US)

(72) Inventors: Thomas Paul Schmit, Huntington, NY (US); Abhishek Shrivastava, Jaunpur (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/719,057

(22) Filed: Dec. 18, 2012

(65) Prior Publication Data

US 2014/0169561 A1 Jun. 19, 2014

(51) Int. Cl.
- *H04L 29/00* (2006.01)
- *G06F 21/60* (2013.01)
- *H04L 29/06* (2006.01)
- *H04W 12/04* (2009.01)

(52) U.S. Cl.
CPC ............. *H04W 12/04* (2013.01); *G06F 21/606* (2013.01); *H04L 63/02* (2013.01)
USPC ....................................................... 380/270

(58) Field of Classification Search
CPC ..... H04L 63/02; H04L 63/306; H04L 63/823; H04L 63/1441; H04W 76/022
USPC ........................................................ 380/270
See application file for complete search history.

(56) References Cited

U.S. PATENT DOCUMENTS

| | | | |
|---|---|---|---|
| 7,596,223 B1* | 9/2009 | Vogel, III | 380/270 |
| 8,069,470 B1* | 11/2011 | Montenegro | 726/3 |
| 2004/0083362 A1* | 4/2004 | Park et al. | 713/162 |
| 2008/0186171 A1* | 8/2008 | Gates | 340/541 |
| 2009/0154482 A1* | 6/2009 | Ham et al. | 370/408 |
| 2010/0140926 A1* | 6/2010 | Swift et al. | 285/256 |
| 2010/0332831 A1* | 12/2010 | Shon et al. | 713/168 |
| 2012/0144197 A1* | 6/2012 | Chung et al. | 713/169 |
| 2012/0257753 A1* | 10/2012 | Ochikubo et al. | 380/270 |
| 2013/0103939 A1* | 4/2013 | Radpour | 713/152 |

OTHER PUBLICATIONS

Jennic Technology for a Changing World, JenNet-IP Stack User Guide, Jan. 3, 2012, pp. 1-14, 68-254, JN-UG-3080 Rev. 0.6, NXP Laboratories UK Ltd.,Sheffield, UK.

* cited by examiner

*Primary Examiner* — Hadi Armouche
*Assistant Examiner* — Shahriar Zarrineh
(74) *Attorney, Agent, or Firm* — Husch Blackwell LLP

(57) ABSTRACT

A method and apparatus of providing a security system. The method includes the steps of a registering sensor having a secret key and an IEEE or MAC address automatically forming a commissioning key, the registering sensor forming a registration request including the IEEE or MAC address and the commissioning key, a co-ordinator sensor receiving the wireless request for registration from the registering sensor, the co-ordinator sensor having a separate copy of the secret key, the co-ordinator sensor automatically authenticating the registering sensor via the received request for registration and the separate copy of the secret key and the registering sensor joining the co-ordinator sensor of the wireless network under the 6LoWPAN operating protocol.

19 Claims, 2 Drawing Sheets

US 8,792,645 B2

AUTHENTICATION AND DATA SECURITY FOR WIRELESS NETWORKS

FIELD

The field relates to security systems and more particularly to wireless security systems.

BACKGROUND

Security systems are well known. Such systems typically involve a secured area protected by one or more sensors. The secured area may include some form of physical barrier (e.g., a wall, a fence, etc.) provided around the secured area with one or more portals (e.g., doors, windows, etc.) that allow entry into or egress from the secure area by authorized persons. The sensors may be provided in the form of limit switches that are arranged to detect opening of the portals by intruders. The sensors may also be provided in the form of motion detectors that detect motion within a portion of the secured area.

The sensors may be coupled to a local alarm panel. In the event of detection of an intruder, the alarm panel may activate a local audible alarm. The alarm panel may also send an alarm message to a central monitoring station.

The sensors may be coupled to the alarm panel wirelessly. In this case, each of the sensors (and alarm panel) is equipped with a separate radio frequency transceiver. Such transceiver usually operates at a low-power level that does not require an FCC license.

In most cases, the wireless exchange between transceivers is encrypted to avoid subversion of the security system. Usually, this requires the use of secret coding schemes. However, this makes the set-up of such wireless sensors time consuming and expensive. Accordingly, a need exists for better methods of setting up such systems.

DETAILED DESCRIPTION OF AN ILLUSTRATED EMBODIMENT

Figure 1:
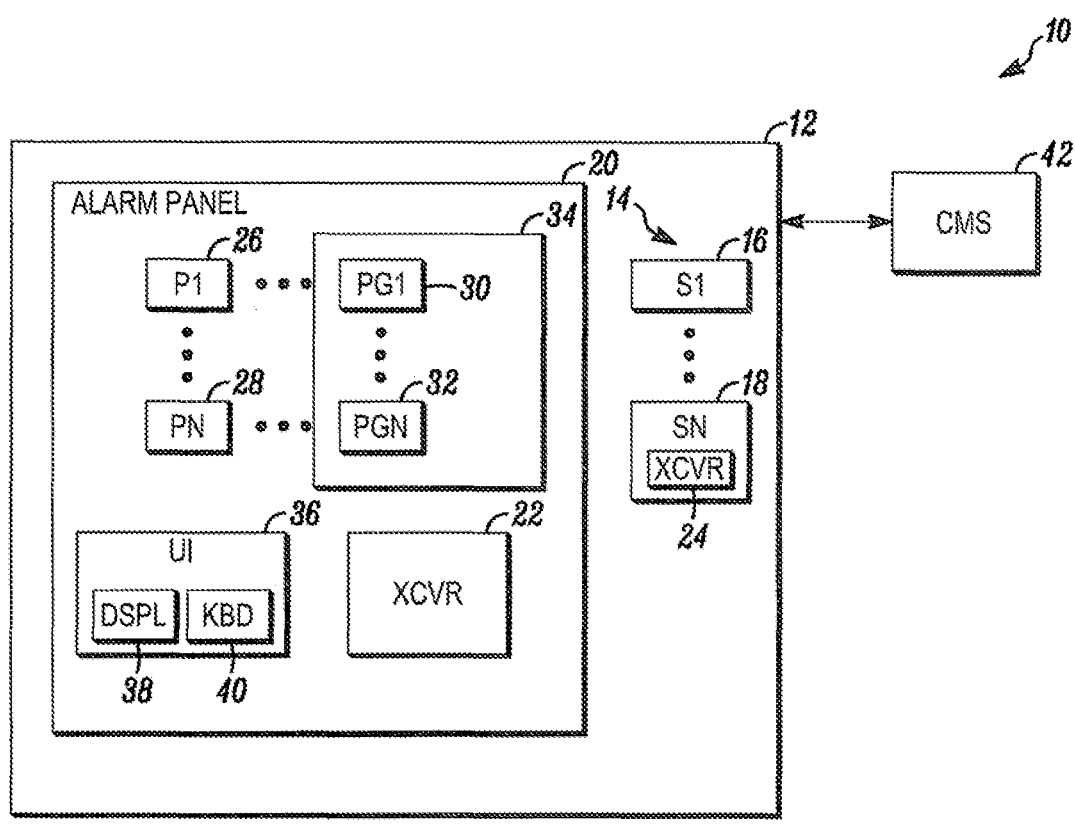
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the security system 10 is a group 14 of sensors 16, 18 used to protect a secured area 12. The sensors 16, 18, in turn, may be coupled to an alarm panel 20 that monitors a status of each of the sensors 16, 18.

The sensors 16, 18 may be based upon any of a number of different technologies. For example, the sensors 16, 18 may include one or more limit switches coupled to a door or window that provides entrance to or egress from the secured area 12.

Alternatively, the sensors 16, 18 may include one or more motion detection devices using infrared or image processing techniques. For example, under one embodiment, the one or more devices 16, 18 may be PIR devices. Alternatively, the one or more devices may be cameras with a processor that compares successive images to detect the movement of people or objects across a field of view of each of the cameras.

As a still further alternative, the sensors 16, 18 may include one or more fire or gas detection devices. Where the sensors detect fires, the devices 16, 18 may be based upon any of a number of different sensing methodologies (e.g., carbon monoxide detection, smoke detection, etc.).

Each of the devices 16, 18 may be coupled to the alarm panel 20 wirelessly. In this regard, one or more wireless transceivers 22 within the alarm panel 20 may be coupled to a respective transceiver 24 within each of the sensors 16, 18.

Included within the alarm panel 20 may be one or more processing apparatus (processors) 26, 28 that monitor the sensors 16, 18. Included within each of the sensors 16, 18 may also be one or more processors 26, 28. The processors 26, 28 may operate under control of one or more computer programs 30, 32 loaded from a non-transitory computer readable medium (memory) 34. As used herein, reference to a step performed by one of the programs 30, 32 is also a reference to the processor 26, 28 that executed that step.

In general, the alarm panel 20 may be controlled through a user interface 36. A user may arm or disarm the system 10 and panel 20 through a keyboard 40 of the user interface. The status of the alarm panel 20 may be shown on a display 38.

Once armed, a sensor processor 26, 28 may monitor a state of each of the sensors 16, 18. Upon detection of the activation of one of the sensors 16, 18, the sensor processor may transfer notification of activation to an alarm processor 26, 28. The alarm processor, in response, may send an alarm message to a central monitoring station 42. The central monitoring station may respond by summoning the fire or police department depending on the type of alarm.

Figure 2:
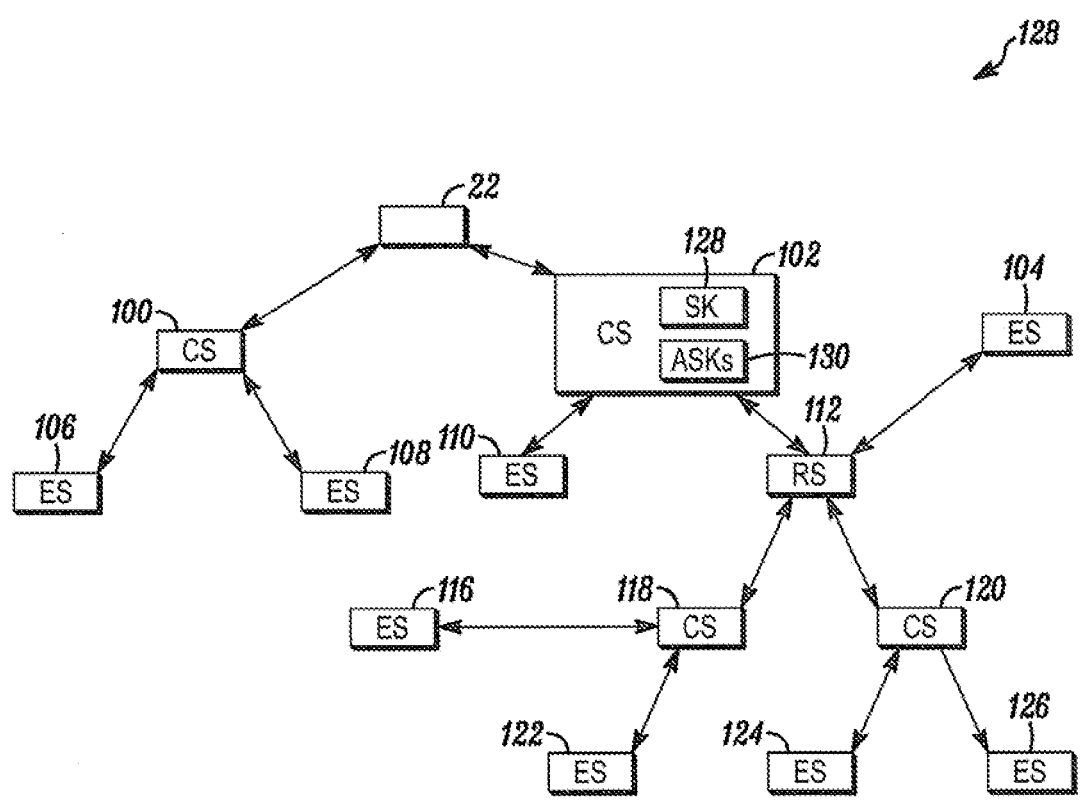
FIG. 2 is a wireless network of the system of FIG. 1.

FIG. 2 depicts a wireless communication network 128 including a group 14 of sensors 16, 18 (labeled 100-126 in FIG. 2) and transceiver 22. For convenience, the sensors 100-126 of FIG. 2 will be used for purposes of explaining the communication system that interconnects the sensors 100-126 with each other and with the alarm panel 20 through transceiver 22.

In general, the sensors 100-126 exchange packets with each other and with the transceiver 22 under Internet Protocol version 6 (IPv6). With certain exceptions, the communication network of FIG. 2 organizes itself into a communication hierarch under an IPv6 over a Low power Wireless Personal Area Networks (6LoWPAN) protocol. One exception is the use of a secret key or array of secret keys described in more detail below.

The wireless network of FIG. 2 includes a number of sensors that operate to co-ordinate communication among other sensors (co-ordinator sensors 100, 102, 118, 120) and a number of sensors at the end of a respective communication chain (end sensors 104, 106, 108, 110, 116, 122, 124, 126). The system of FIG. 2 also includes a sensor that routes communication among sensors (router sensor 112).

The transceivers 22, 24 of the sensors 100-126 and alarm panel 20 may operate in the frequency range of from 2405 to 2480 Mhz. The transceivers may operate on 16 different channels within this frequency range.

Each of the sensors 100-126 may be provided with a secret key 128 or array 130 of secret keys 128 and a system address of the alarm panel 20. Each of the sensors 100-126 may also be provided with its own unique Electrical and Electronics Engineers (IEEE) address or a Media Access Control (MAC) address. The secret keys 128, the system address of the panel 20 and the IEEE or MAC address may be provided via direct physical connection with a programming device during manufacture in order to ensure the security of the sensors 100-126.

In order to form a wireless network, each of the co-ordinator sensors may be provided with the details of the sensors that will potentially join the network. A valid sensor may be identified by the IEEE or MAC address and a unique commissioning key. In this regard, the commissioning key is independently formed within each of the sensors 100-126 by an encryption processor 26, 28 of the sensor 100-126. In this regard, the commissioning key is formed by encryption of the IEEE or MAC address with the secret key.

In order to form a network, each of the end sensors may send a registration message to a respective co-ordinator sensor as part of a process that allows the end sensor to join the co-ordinator sensor. The registration message includes the IEEE or MAC address of the end sensor and the commissioning key of the end sensor. The co-ordinator sensor receives the registration message and authenticates the end sensor by using its own separate copy of the secret key to decrypt the commissioning key within a decryption processor and thereby recover the IEEE or MAC address of the end sensor. However, since the IEEE or MAC address was included within the originally received registration request message under an unencrypted format, a comparison processor of the co-ordinator sensor may be used to simply compare the recovered IEEE or MAC address with the unencrypted IEEE or MAC address originally received as part of the registration message. Where there is a match between the recovered and originally received IEEE or MAC address, the end sensor is authenticated. In a similar manner, each sensor 100-126 may authenticate any transmission from any other sensor 100-126. A similar process can be used by the alarm panel to authenticate transmissions from the sensors 100-126 and by the sensors to authenticate transmissions from the alarm panel.

Turning now to the wireless network, in general, an explanation will be provided of how the sensors 100-126 arrange themselves into the wireless network. For simplicity, the explanation with be based primarily upon a single co-ordinator sensor and a single end sensors. A similar process may be used by co-ordinator sensors to join other co-ordinator sensors and the alarm panel 20.

For example, upon start-up, the co-ordinator sensors immediately begin to search for a suitable radio channel. In this regard, the co-ordinator sensor will search for, identify and adopt for use the radio frequency channel with the least measured activity.

The co-ordinator sensor may assign a unique Personal Area Network (PAN) identifier (id) to the network. The PAN identifier may be stored in a memory of the sensor during manufacture or may be based upon the secret key 128. The co-ordinator sensor may listen for the PAN ids of any neighboring networks to verify that the PAN identifier is unique. If it is not, then the co-ordinator sensor may increment the identifier until a unique value is found.

The co-ordinator sensor may then enter a "commissioning mode" where the co-ordinator sensor may join other sensors. The co-ordinator sensor then listens on the adopted channel for registration requests from other sensors (router sensors and end sensors) to join the network.

Upon start-up, end sensors (and router sensors) scan the available channels to identify channels with coordinating sensors in commissioning mode. The end sensor (and routing sensors) transmit beacon requests on the identified channels and wait for beacons from coordinating sensors that the sensor may join. In this regard, the end sensors (and router sensors) may detect one or more coordinating sensors that the end sensors (and router sensors) may join in a parent-child relationship.

The end sensors may join the coordinating sensor in either a star or tree network. In a star network, a router sensor would simply assume the role of any another end sensor.

Initially, the co-ordinator sensor may be the only potential parent of a new end sensor. However, once the network has partially formed, the joining end sensor may be able to detect the co-ordinator sensors and one or more routing sensors of the same network. In this case, the end sensor may use a sequential set of rules to choose its parent. The first choice may be based upon signal strength where the parent with the highest signal strength is selected first. Next, the number of children of each parent is considered where preference is given to the parent with the fewest children. Finally, the depth of the tree is considered where preference is given to the parent highest in the tree. These rules are used in reverse order by any sensor operating as a router sensor.

The end sensor then sends a registration message as a join request to the selected parent, asking to join the wireless network through it. The co-ordinator sensor may initially reject the join request pending verification (via the IEEE or MAC address and commissioning key) that the end sensor is authorized to register with the system. After the initial rejection, the end sensor may resend the registration request to the same potential parent this time encrypting the request with the sensor's commissioning key. Provided that the sensor has been successfully validated by the potential parent and the registration request can be decrypted with the secret key, the request is accepted.

The end sensor then sends an establish route message to the co-ordinator sensor. The co-ordinator sensor replies with a confirmation of the sensor's membership in the network. This exchange of messages causes a set of entries for the end sensor being added to the routing tables between the end sensor and coordinating sensor.

In general, any packet sent by a sensor through the network 128 may contain two addresses for routing purposes including a first address of the destination sensor and a second address of the next hop sensor. The second address is modified after each hop by the receiving sensor as the packet propagates through the network, and becomes the same as the destination sensor address for the final hop.

In response to receipt of the establish route message, the co-ordinator sensor may forward a network security key (run time key) to the end sensor. The network security key may be based upon the secret key or may be a selected one of the array of keys.

Once the sensors 100-126 have organized themselves into a wireless communication network 128, a respective monitoring processor 26, 28 within each of the sensor 100-126 may monitor a sensing element for changes. Upon detecting a change above a threshold value the processor 26, 28 may compose and send a packet to a corresponding processor 26, 28 with the alarm panel notifying the alarm panel of the change. The packet may be transmitted directly to the panel 20 in some cases (e.g., co-ordinator sensor 100) or may be received and retransmitted by other sensors (e.g., sensor 106 transmits the packet to sensor 100 and sensor 100 retransmits the packet to the alarm panel 20.

The system 10 and, especially, the wireless network of the system 10 offers a number of advantages over conventional systems. For example, the saving of the secret key into the sensors 100-126 allows the system to be set up without the need for a trained technician to enter passwords or other encryption data. Since each sensor 100-126 has the secret key stored in memory, each system 10 can identity any other member of its network of sensors 100-126 without any ambiguity.

In addition, the presence of the secret key saved in the memory of each of the devices 100-126 allows the secret key to be changed periodically (or immediately after installation) without compromising security. In this case, any new secret key may simply be encrypted by the originally saved secret key and transferred over the air-interface without loss of security.

Alternatively, where an array of secret keys is saved in memory, the secret key can be selected sequentially or randomly from the array of secret keys for a predetermined time period.

After the predetermined period of time, the next secret key in the array may be used for another period of time.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
a registering sensor having a secret key and an Institute for Electrical and Electronics Engineers (IEEE) address or a Media Access Control (MAC) address automatically forming a commissioning key by encrypting the IEEE or MAC address with the secret key, the registering sensor operating under an Internet Protocol version 6 over Low power Wireless Personal Area Network (6LoWPAN) operating protocol in a wireless network;
the registering sensor forming a registration request including the IEEE or MAC address and the commissioning key;
a co-ordinator sensor operating under the 6LoWPAN operating protocol in the wireless network receiving the wireless request for registration from the registering sensor, the co-ordinator sensor having a separate copy of the secret key;
the co-ordinator sensor automatically authenticating the registering sensor via the received request for registration and the separate copy of the secret key; and
the registering sensor joining the co-ordinator sensor of the wireless network under the 6LoWPAN operating protocol and wherein the secret key and IEEE address or MAC address are provided to the registering sensor and co-ordinator sensor during manufacture to ensure security wherein the common secret key or an array of secret keys are saved within a memory of the co-ordinator sensor during manufacture of the co-ordinator.

2. The method as in claim 1 wherein the step of automatically authenticating further comprises the co-ordinator sensor recovering the IEEE or MAC address by decrypting the commissioning key using the separate copy of the secret key and matching the recovered IEEE or MAC Address with the received IEEE or MAC address.

3. The method as in claim 1 wherein the common secret key further comprises an array of secret keys.

4. The method as in claim 1 further comprising the co-ordinator sensor selecting one of the array of secret keys, encrypting a new network key using the selected secret key and sending the encrypted new network key to a child sensor.

5. The method as in claim 4 further comprising selecting a different one of the array of secret keys each time the network key is changed.

6. The method as in claim 1 further comprising saving the commissioning key and IEEE or MAC address in a list of sensors registered with the co-ordinator sensor.

7. An apparatus comprising:
a registering sensor that operates under an Internet Protocol version 6 over Low power Wireless Personal Area Network (6LoWPAN) operating protocol in a wireless network, the registering sensor has a secret key and an Institute for Electrical and Electronics Engineers (IEEE) address or a Media Access Control (MAC) address, the registering sensor automatically forms a commissioning key by encrypting the IEEE or MAC address with the secret key, the registering sensor forms and wirelessly transmits a registration request including the IEEE or MAC address and the commissioning key; and
a co-ordinator sensor operating under the 6LoWPAN operating protocol in the wireless network, the co-ordinator sensor receives the wireless request for registration from the registering sensor, the co-ordinator sensor has a separate copy of the secret key, the co-ordinator sensor automatically authenticates the registering sensor via the received request for registration and the separate copy of the secret key, wherein the registering sensor joins the co-ordinator sensor of the wireless network under the 6LoWPAN operating protocol and wherein the secret key and IEEE address or MAC address are provided to the registering sensor and co-ordinator sensor during manufacture to ensure security wherein the common secret key or an array of secret keys are saved within a memory of the co-ordinator sensor during manufacture of the co-ordinator.

8. The apparatus as in claim 7 wherein the co-ordinator sensor further comprises a processor that recovers the IEEE or MAC address by decrypting the commissioning key using the separate copy of the secret key and matches the recovered IEEE or MAC Address with the received IEEE or MAC address.

9. The apparatus as in claim 7 wherein the secret key further comprises an array of secret keys.

10. The apparatus as in claim 9 further comprising a key processor that selects one of the array of secret keys for creation of the commissioning key.

11. The apparatus as in claim 9 further comprising a network key processor that selects one of the array of secret keys and encrypts a new network key with the selected secret key.

12. The apparatus as in claim 7 wherein the registering sensor further comprises a plurality of child sensors that each register with the co-ordinator sensor.

13. The apparatus as in claim 7 further comprising a router sensor that registers with the co-ordinator sensor.

14. The apparatus as in claim 7 further comprising a security system.

15. An apparatus comprising:
a wireless security network that operates under an Internet Protocol version 6 over Low power Wireless Personal Area Network (6LoWPAN) operating protocol;
a wireless sensor of the wireless network having a secret key and an Institute for Electrical and Electronics Engineers (IEEE) address or a Media Access Control (MAC) address provided to the wireless sensor during manufacture to ensure security, the wireless sensor creates a commissioning key by encrypting the IEEE or MAC address using the secret key, forms a request for registration including the IEEE or MAC address and commissioning key and transmits the request for registration;

a co-ordinator sensor of the wireless network, the co-ordinator sensor receives a wireless request for registration from a wireless sensor wherein the secret key and IEEE address or MAC address are provided to the registering sensor and co-ordinator sensor during manufacture to ensure security;

a decryption processor of the co-ordinator sensor that decryptes a commissioning key to recover the IEEE or MAC address using the common secret key; and a setup processor that automatically joins the wireless sensor to the wireless security network under the 6LoWPAN operating protocol wherein the common secret key or an array of secret keys are saved within a memory of the co-ordinator sensor during manufacture of the co-ordinator.

16. The apparatus as in claim 15 wherein the wireless sensor further comprises an intrusion detector.

17. The apparatus as in claim 15 wherein the intrusion detector further comprises a perimeter sensor that detects an intruder entering a secured area.

18. The apparatus as in claim 15 further comprising an interface that couples alarm messages to a central monitoring station.

19. The apparatus as in claim 15 further comprising an alarm panel coupled to the co-ordinator sensor.

* * * * *